United States Patent
Lorenz et al.

[11] Patent Number: 6,055,020
[45] Date of Patent: Apr. 25, 2000

[54] METHOD AND DEVICE FOR TRANSMITTING ADDITIONAL DATA IN TELEVISION CHANNELS

[75] Inventors: Rudolf Werner Lorenz, Gross-Bieberau; Adolf Finger, Dresden; Hartmut Hiller, Freital; Oliver Götting, Dresden; Jens Schönthier, Dresden; Frank Poegel, Dresden, all of Germany

[73] Assignee: Deutsche Telekom AG, Bonn, Germany

[21] Appl. No.: 08/973,896
[22] PCT Filed: Jun. 14, 1996
[86] PCT No.: PCT/DE96/01060
§ 371 Date: Jul. 2, 1998
§ 102(e) Date: Jul. 2, 1998
[87] PCT Pub. No.: WO97/00576
PCT Pub. Date: Jan. 3, 1997

[30] Foreign Application Priority Data

Jun. 16, 1995 [DE] Germany ............ 195 22 590

[51] Int. Cl.[7] .................................................. H04N 7/08
[52] U.S. Cl. .................... 348/473; 348/476; 348/477
[58] Field of Search .................... 348/461, 467, 348/468, 463, 464, 473, 476, 477, 478, 479; H04N 7/00, 11/00, 7/08

[56] References Cited

U.S. PATENT DOCUMENTS

| | | | |
|---|---|---|---|
| 3,576,391 | 4/1971 | Houghton | 348/467 |
| 3,927,250 | 12/1975 | Rainger | 348/467 |
| 3,982,064 | 9/1976 | Barnaby | 348/467 |

FOREIGN PATENT DOCUMENTS

| | | |
|---|---|---|
| 25 16 742 | 10/1976 | Germany . |
| 25 29 728 | 1/1977 | Germany . |
| 29 01 034 | 7/1980 | Germany . |
| 31 3 406 | 11/1982 | Germany . |
| 37 32 111 | 4/1989 | Germany . |

*Primary Examiner*—Michael H. Lee
*Attorney, Agent, or Firm*—Kenyon & Kenyon

[57] ABSTRACT

Therefore, the object of the invention is to utilize the unused channel capacity of the television channel even more optimally for additional signals. Both on the transmitting, as well as the receiving side, the clock pulses for video and audio data to be additionally transmitted are generated from the FBAS useful signal by counting, weighting and decision-making, both signals being separately digitized, buffered, and compressed before being superimposed upon on the useful video signal. Subsequent to the same clock pulse generation, the steps follow in the reverse order on the receiver side. The implementation can be carried out on the transmitter side using additional equipment, on the receiver side by computer software or additional devices installed in the conventional TV set. The application can be carried out for any additional video and sound signals. A preferred special application is a community picture broadcast similar to a slide presentation.

17 Claims, 7 Drawing Sheets

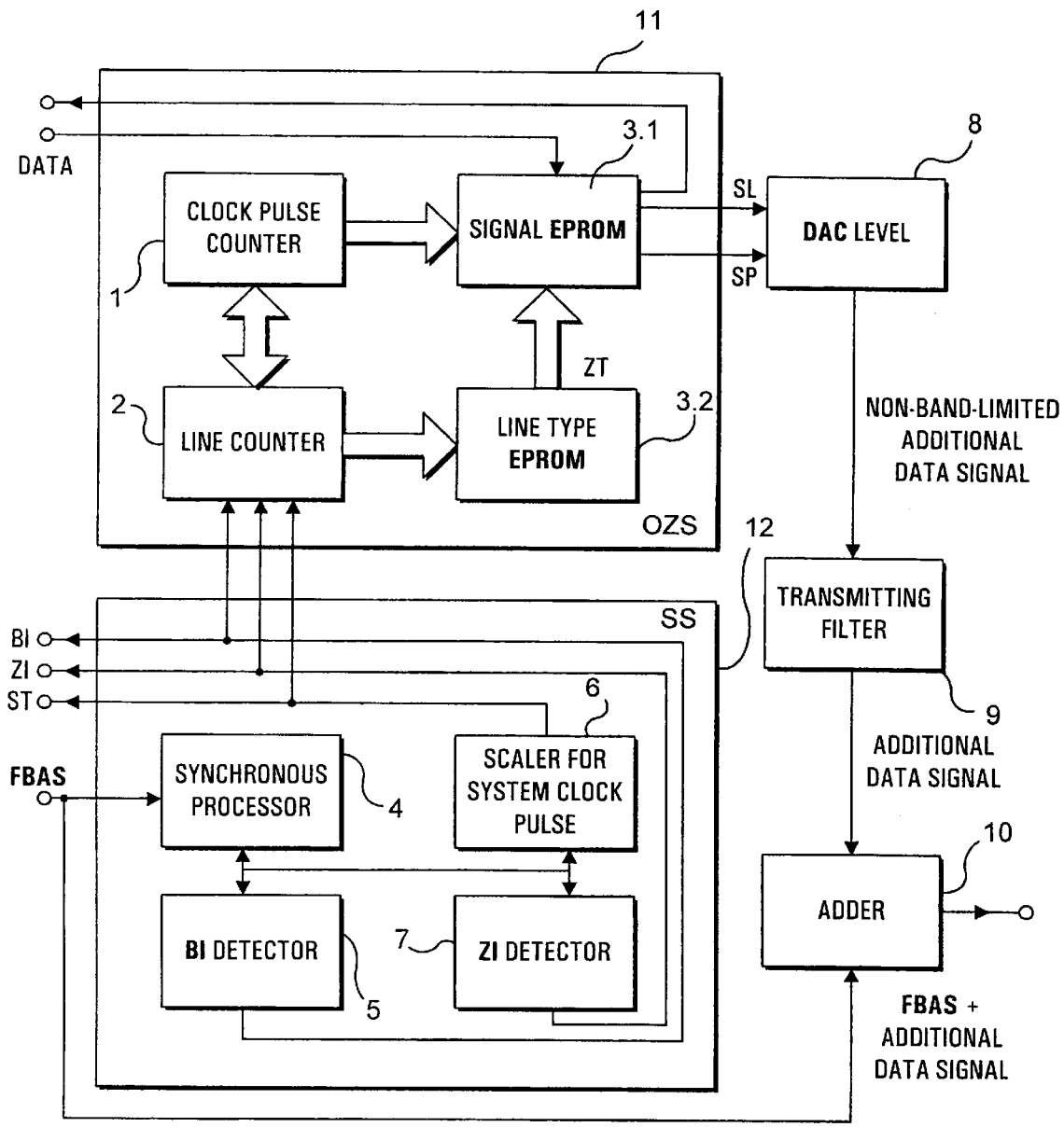
F I G. 1

METHOD AND DEVICE FOR TRANSMITTING ADDITIONAL DATA IN TELEVISION CHANNELS

FIELD OF THE INVENTION

The present invention relates to a method of transmitting additional data in television frames, as well as to a transmitting device, a receiving device, and a system for carrying out the method. Methods and equipment are known for audio data, for example, from Gassmann/Eckert: "Das COM-System" [The COM System],*Funkschau* 1970, no. 20, pages 689–692 and no. 21, pages 749–750, and for video data from Langenkamp/Löwy: "Megatext-IC für Videotext und Grafik" [Megatext IC for video text and graphics], *RFE*1994, no. 7, pages 18–20.

The properties of the FBAS signal (color, video, sweep and synchronization signal) leave open the possibility of superpositioning other information-carrying signals (additional data) without interfering with reception of the television broadcast program. Although most publications are concerned with only one type of additional data, the transmission of several additional test signals and data signals is described, for example, by Rudolf Meusel: *Fernsehtechnik* [*Television Technology*], Hüttig 1991, on pages 210–227 in chapter 9. The additional data are transmitted at the highest possible transmission rate and with a high transmission reliability.

Although radio satellite technology has permitted reception of an ever increasing number of television programs, local program providers offer no possibility of regional services because of the large coverage zones and high cost. However, broad-band communication networks are not suitable for portable equipment and reception sites at great distances. The terrestrial transmitter network infrastructure already contains test lines and video text, mainly in the video-free lines. Additional wireless services have often failed because of the shortage of frequencies and the high cost of television studios. German Published Application DE-OS 25 16 742 discloses a television system with which digitized audio signals are transmitted during the back porch period. To be able to transmit a higher data rate, the respective FBAS signal is modified so that the back porch is lengthened at the expense of the duration of the horizontal synchronizing pulse. The modified FBAS signal and the digitized audio signals are sent to an adder that inserts the digitized audio signal into the lengthened back porch.

German Published Application DE-OS 31 03 406 discloses a method of transmitting digitized audio signals in the horizontal blanking interval of a video signal. However, this prior art document does not address the problem of making the color and/or video signal-free intervals of an FBAS signal optimally available for the transmission of additional data.

German Published Application DE-OS 37 32 111 discloses a method of adjusting the propagation time of video and audio signals to a reference signal. According to the known method, before the video signal is entered into the memory of a video synchronizer, the audio signal is inserted into the blanking intervals of the video signal. The video and audio signals are processed simultaneously in the memory of the video synchronizer. After triggering the processed signal, the audio signal inserted is separated from the video signal again. This document also does not address the problem of being able to better utilize the color and/or video signal-free intervals of the FBAS signal for transmission of additional data.

German Published Application DE-OS 29 01 034 discloses a method and a circuit arrangement for compressing and decompressing analog signals in digital form. The compressed digital signals are, in fact, inserted into the free information intervals of video signals or transmitted instead of television signals. However, this document does not contain any references or suggestions indicating how the color and/or video signal-free intervals of an FBAS signal can be utilized better for the transmission of additional data.

The object of present invention is to utilize the unused channel capacity of the television channel even more optimally and thus ensure a high transmission reliability, high transmission rates, high system variability, interference-free reception of the television program, superpositioning of the additional data without technical intervention in the television transmitter modules and the compatibility of existing television equipment for PALplus, NTSC and SECAM.

This method with its counting, weighting and decision-making elements is readily suitable for additional implementation in computers which can also be equipped with television receiving cards for multimedia purposes.

An advantageous possible refinement of the method facilitates implementation in terms of both hardware on the receiving end and addition on the transmitting end.

A suitable device for implementation in terms of hardware is suitable as an addition to the existing transmitters and receivers of the television broadcast network.

With the present invention, the information-carrying signals for the additional data transmission are merged using an overlay circuit in such a way that signals can be program-positioned in all color and video signal-free intervals.

The additional data transmission system according to present invention has a number of advantages. Due to the selection with counting and weighting, the system can be configured in making a decision about the use of the time segments for the additional data transmission in such a way that there is no interference in reception of the television broadcast. The superpositioning and reception of the information-carrying additional data signals can be accomplished with small, relatively inexpensive additional equipment. The transmission rate can be adapted as needed to the conditions of the real channel by programming. The additional data transmission is implemented with signal levels lower than 20 mV, thus ensuring compatibility with conventional commercial television equipment.

BRIEF DESCRIPTION OF THE DRAWINGS

The present invention is explained in greater detail below on the basis of one example and with reference to the respective figures, which show:

FIG. 1: the additional data adder on the transmitting end,

DETAILED DESCRIPTION

Figure 2A:
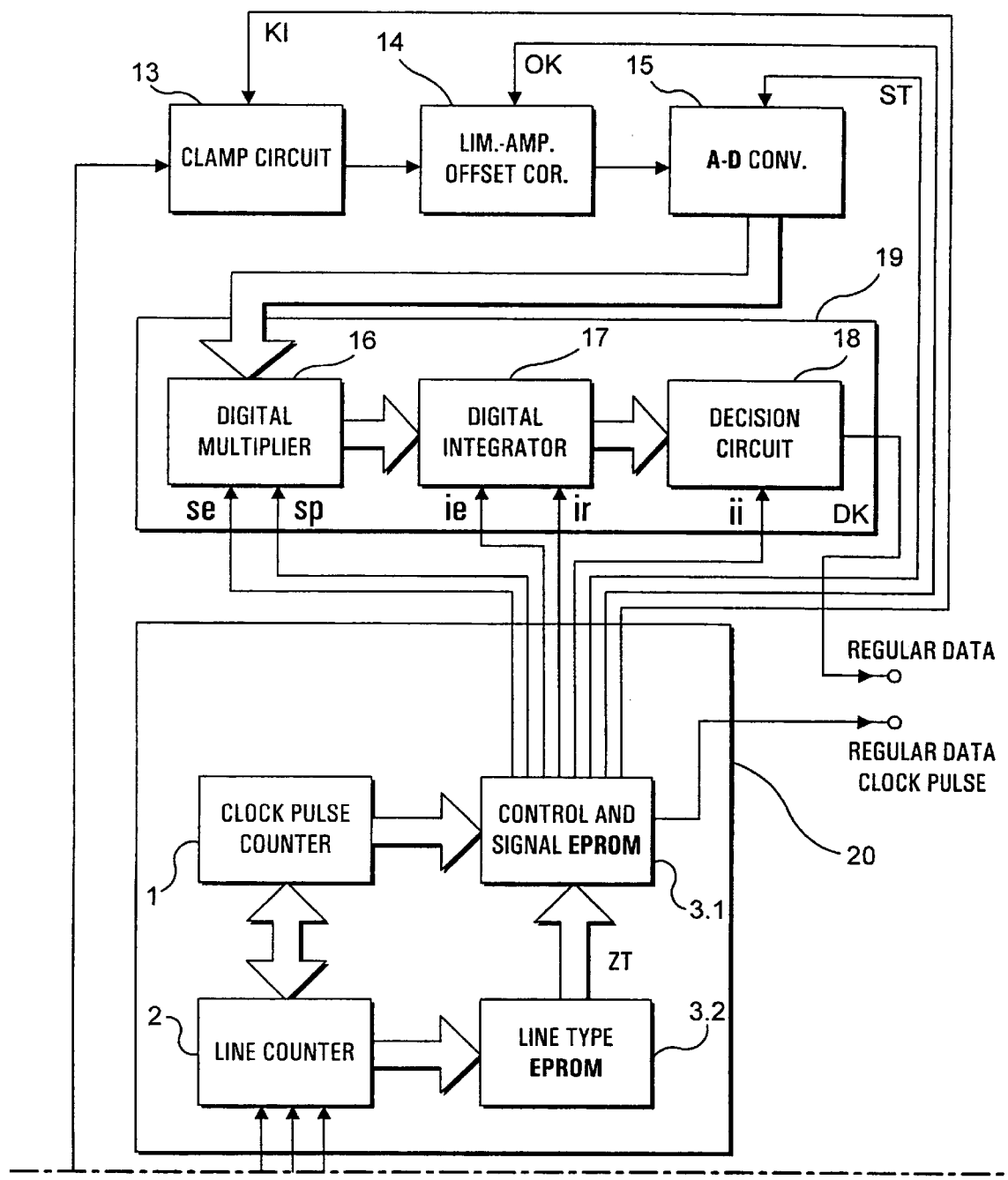
FIG. 2: the additional data receiver on the receiving end.

FIG. 1 shows the data-controlled line-selective split sequence generator 11 that delivers a split sequence signal sp and a split permission signal se (FIGS. 3 and 4), which is converted to a three-level additional data signal of the levels 0, + and − in digital-analog converter 8.

The non-band-limited additional data signal contained at the output of digital-analog converter 8 is limited to the video band width by the effect of transmission filter 9 and is superimposed on the FBAS signal of the first line type or another line type in adder 10. The data-controlled line-selective split sequence generator 11 is controlled by the data to be transmitted, which are polled by the data clock stored in signal EPROM 3.2, and by the time control signals for frame pulse BI, line pulse ZI and system clock pulse ST of transmitter synchronization 12.

Frame pulse BI occurs at the start of each frame, and pulse ZI occurs at the start of each line. The frame pulse rate and the system clock rate are linked together in a phase-locked manner. Beginning with the frame pulse, lines from 0 to 624 are counted in the line counter. Since a number of lines have a similar structure with regard to the additional data signals to be inserted, the address range of signal EPROM 3.1 is addressed with the line number by the line type EPROM 3.2, and signal EPROM 3.1 generates a signal insertion that fits into the respective line structure.

Figure 3:
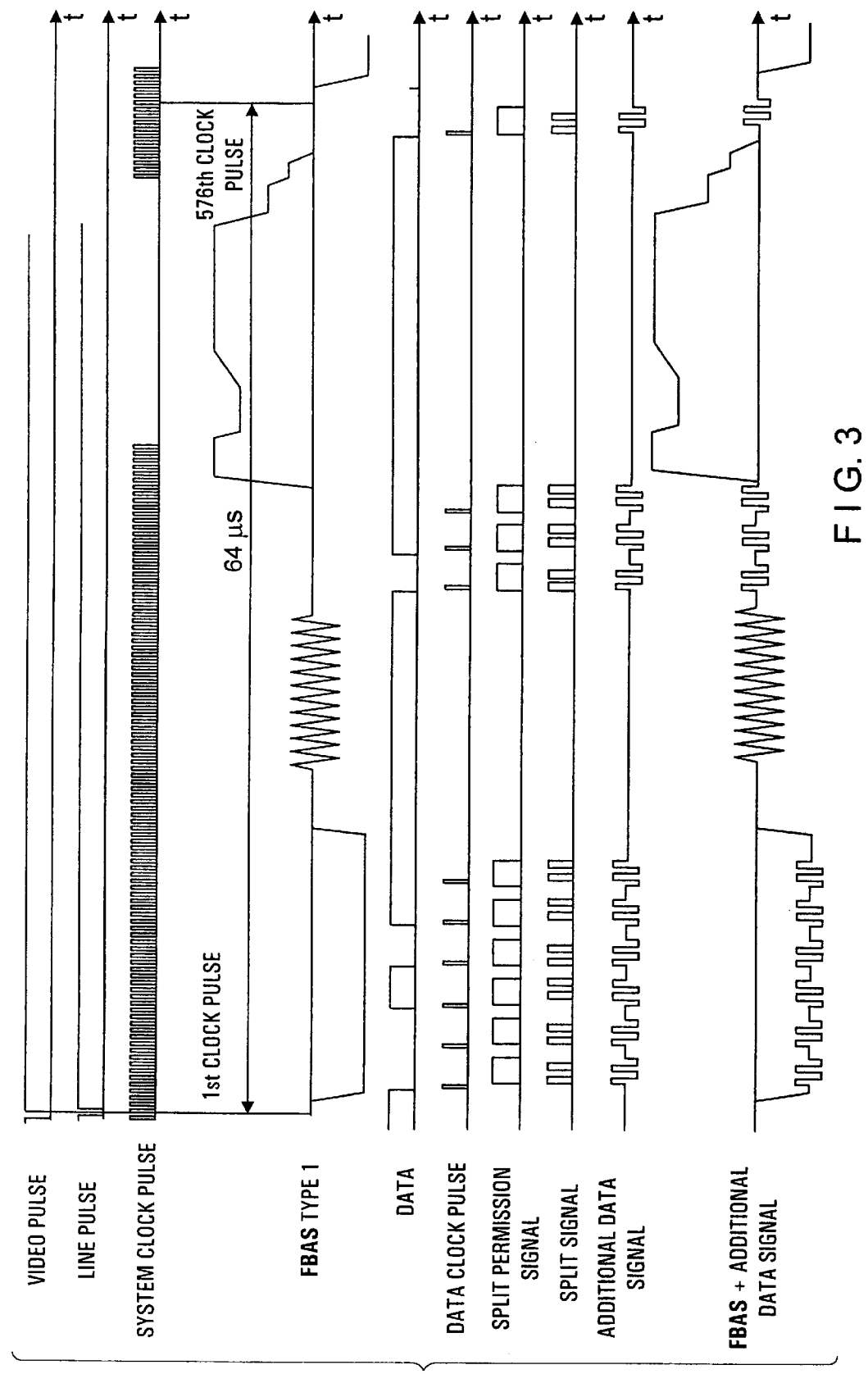
FIG. 3: the signal diagram for superpositioning of the FBAS signal and the additional data signal for the first type of line.

In FIG. 3, the signals for six data symbols have been inserted at the bottom of the synchronization pulse, the signals for three data symbols have been inserted downstream from the color burst, and the signal for one data symbol has been inserted on the front porch.

Figure 4:
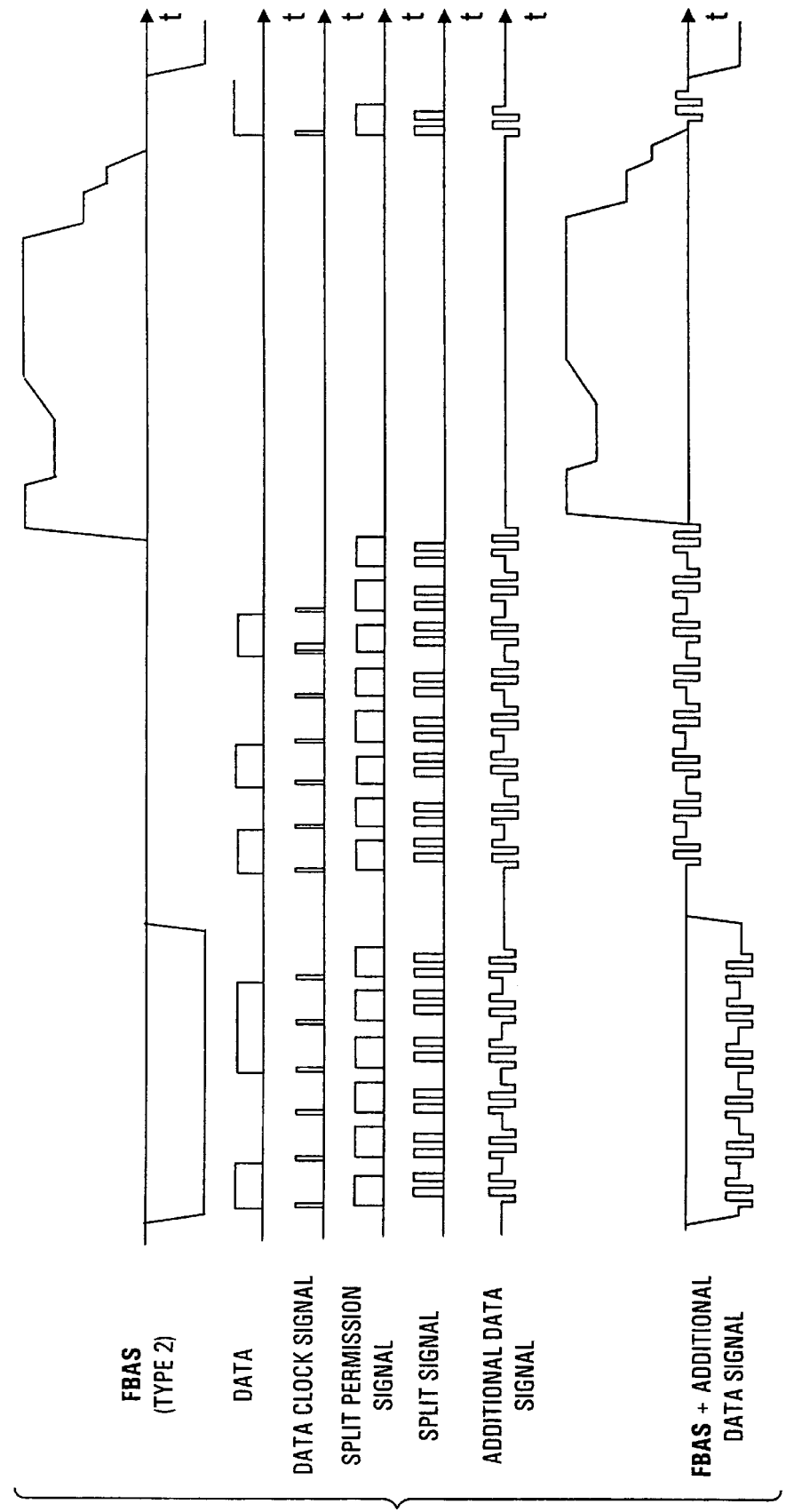
FIG. 4: the signal diagram for superpositioning of the FBAS signal and the additional data signal for a second type of line.

For the type of line shown in FIG. 4, the signals for six data symbols have been inserted at the bottom of the synchronization pulse, the signals for eight data symbols have been inserted on the back porch, and the signal for one data symbol has been inserted on the front porch. Since a number of lines have identical structures, identical signal structures can be stored in signal EPROM 3.1. At the same time, the system clock pulse edges ST are counted over time by the clock pulse counter, e.g., 576 clock pulses per line. With system clock pulse ST and the choice of line type ZT, the signals previously stored in signal EPROM 3.1, namely the split permission se, split signal sp and data clock pulse are read out chronologically, system clock pulse edge by system clock pulse edge, and sent to digital-analog converter 8.

The possibility of being able to fit the information-carrying additional data signals exactly into the desired time intervals of the entire frame is based on the high-precision derivation of frame pulse BI, line pulse ZI and system clock pulse ST from the FBAS signal supplied to transmitter synchronization 12. The core of the transmitter synchronization is a synchronous processor, e.g., circuit TDA 9257 which derives a processor clock pulse of 27 MHz, a horizontal signal HS and a vertical signal VS with a jitter of less than 5 ns from the FBAS signal for further processing. These signals are linked together sequentially and by combination in these modules, namely the scaler for system clock pulse 6, frame pulse detector 5 and line pulse detector 7, in such a way as to obtain a system clock pulse ST of 9 MHz, for example, with 576 system clock pulse edges per television line signal, line pulse ZI, which marks each first-of-line edge of system clock pulse ST, and frame pulse signal BI, which marks each first-of-frame flank of the system clock pulse.

In addition to the polling of split permission signal se and split signal sp, which is ultimately time-controlled, signals BI, ZI and ST are available for adapting between the output speed of the data source whose data are to be transmitted and the data clock pulse of the data-controlled line-selective split sequence generator with a FIFO circuit, for example.

Figure 2B:
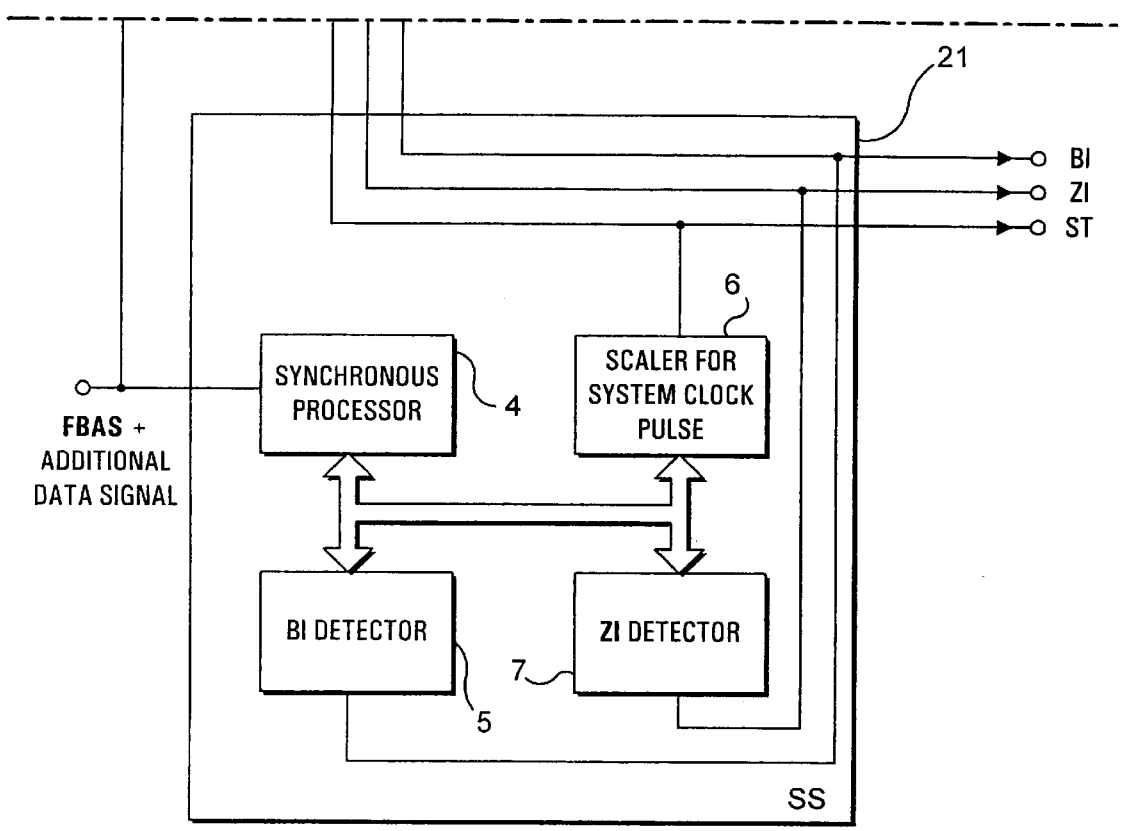
Figure 5:
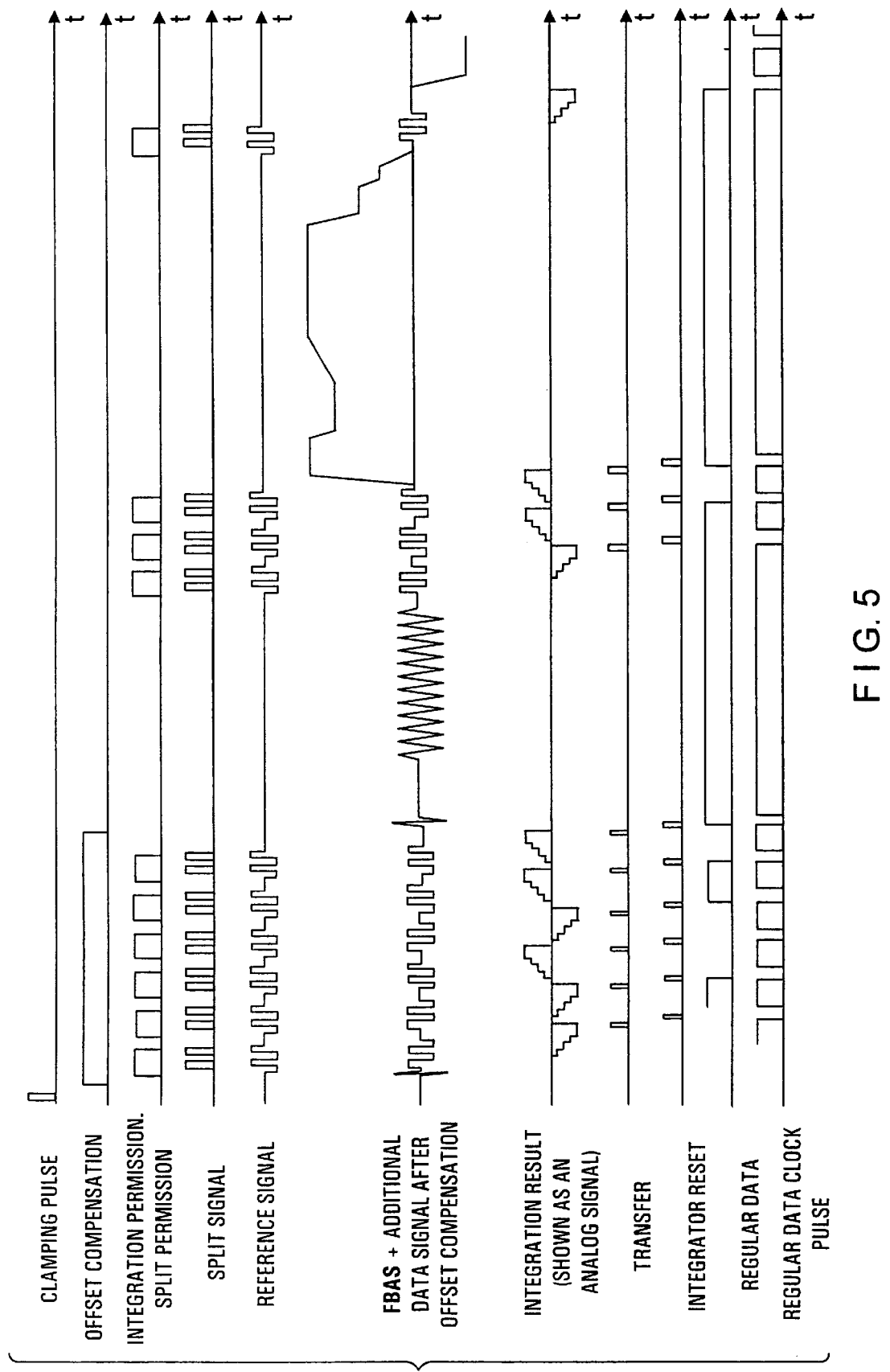
FIG. 5: the signal diagram for reception of the additional data signal for the first type of line.
Figure 6:
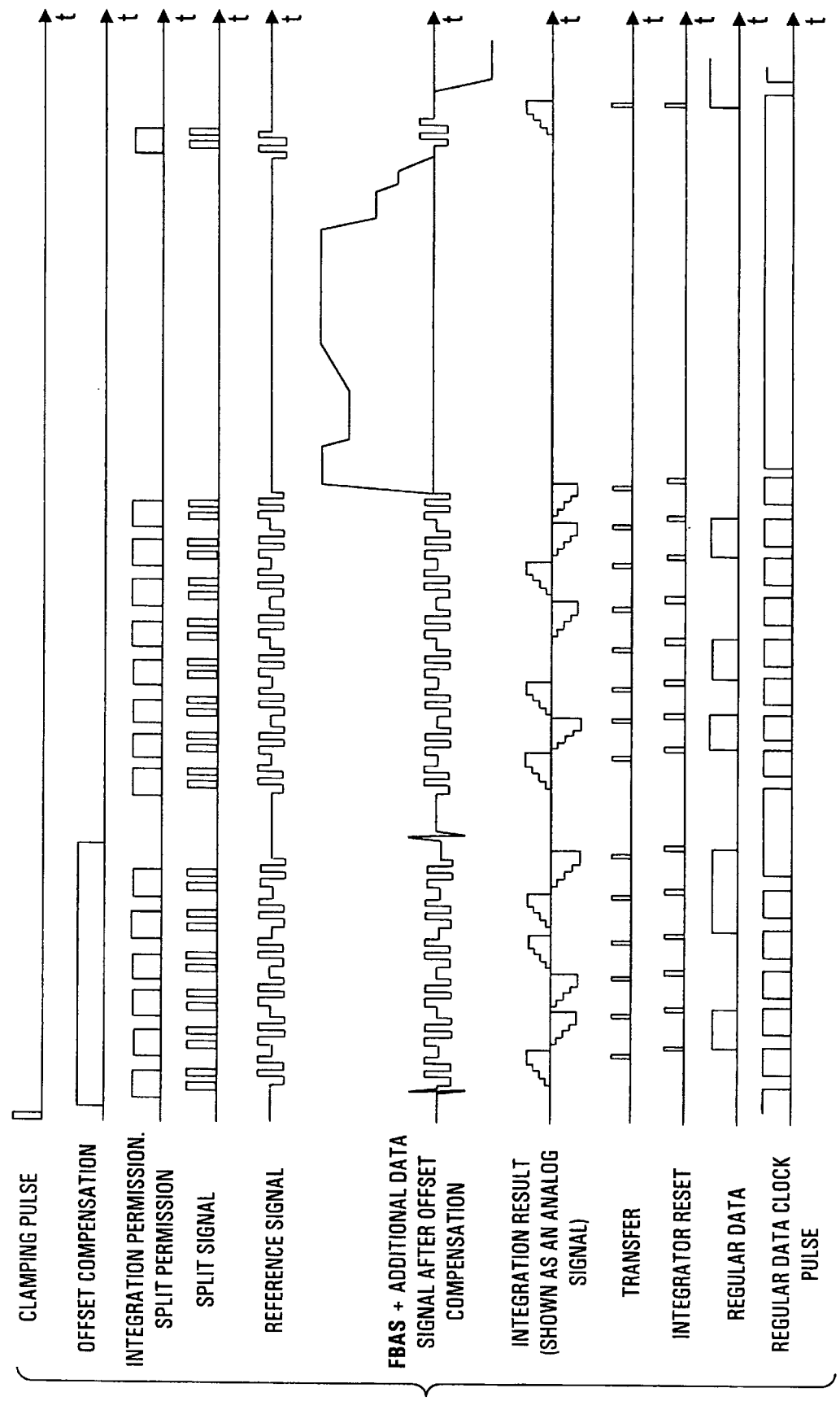
FIG. 6: the signal diagram for reception of the additional data signal for a second type of line.

FIG. 2 shows the additional data receiver to be operated on the receiving end, where the processing of the signals in the receiver and the signals for controlling it are shown in FIG. 5 for the first type of line and in FIG. 6 for another type of line. This additional data receiver consists of receiver synchronization 21, line-selective reference split sequence generator 20 and the analog input part which is in turn composed of clamp circuit 13, limiter amplifier/offset correction 14, analog-digital converter 14 and digital correlator 19. The clamping can be activated by the counting of the clock pulse edges in the line by clock pulse counter 1 and read out of the corresponding memory contents from the control and signal EPROM 3.1. After the sum of the FBAS signal and the additional data signal has passed clamp circuit 13, amplification, limiting and offset correction are performed in limiter amplifier 14 in such a way that the converter range of the downstream analog-digital converter is utilized optimally during the presence of the additional data signals without any overloads (FIGS. 5 and 6).

This offset correction is controlled with signal offset correction ok which is read out of the control and signal EPROM 3.1. The sequence of samples goes in a certain word width to digital multiplier 16, where the output signal of the limiter amplifier is multiplied by the reference signal in the form of the supplied split permission signal se and split sequence signal sp in digital form.

The product is then integrated by digital integrator 17. The result of the integration can be seen in analog representation in FIGS. 5 and 6. The integrator is enabled by integration permission signal ie, which is read out of the control and signal EPROM 3.1, reset by the integrator reset signal ir, and the decision is made by the transfer pulse ü. Except for the fact that only one reference split sequence signal with sp and se and the above-mentioned control signals ie, ir, ü, ki and ok are needed for the reception process, the line-selective reference split sequence generator 20 corresponds to the data-controlled line-selective split sequence generator 11.

In addition to the ultimately regenerated data and the regenerated data clock pulse read out of control and signal EPROM 3.1 (FIGS. 5 and 6), BI, ZI and ST signals are available for adjusting the data output rate of the additional data receiver to the data clock pulse of the downstream data sink with a FIFO circuit, for example.

For transmitter synchronization, the frame pulse BI, line pulse ZI and system clock pulse ST are obtained from the FBAS signal by the interaction of synchronous processor 4, the scaler for system clock pulse 6, frame pulse detector 5 and line pulse detector 7, thus permitting accurate positioning of the additional data signal within the total television frame with an accuracy greater than 5 ns.

In the data-controlled line-selective split sequence generator 20, the total television frame with a time reference of 111.1 ns, for example, can be addressed completely using the frame pulse BI, line pulse ZI and system clock pulse ST, a line counter 2 and a clock pulse counter 1, so the additional data signals which can be selected at will or programmed by EPROM can be fitted into the television frame structure. If the line type is selected by line counter 2 with the help of a line type EPROM 3.2, the storage size for the signal part of the signal and control EPROM 3.1 can be reduced greatly.

For reception synchronization, frame pulse BI, line pulse ZI and system clock pulse ST are generated from the FBAS signal through the interaction of synchronous processor 4, scaler for system clock pulse 6, frame pulse detector 5 and line pulse detector 7, thus permitting a chronologically accurate positioning of the reference signal for the correlation reception within the total television frame with an accuracy greater than 5 ns.

The total television frame in the line-selective reference split sequence generator can be addressed completely using the frame pulse BI, line pulse ZI and system clock pulse ST, a line counter 2 and a clock pulse counter 1, so the additional data signals, which can be selected at will and programmed by EPROM, can be received in the television frame structure by digital correlation receiver 19.

With the same precision, the control signals, namely clamping pulse ki, offset compensation ok, system clock pulse for AD conversion, split permission signal se, split signal sp, integration permission signal ie, integrator reset signal ir and transfer signal ü, which are necessary for the input stages, the AD converter and digital correlation receiver, are generated.

Clamping circuit 13, which is ensured by means of an accurate time control by clamp pulse ki, permits further optimal processing of the mixture of FBAS signal and additional data signal. Limiter amplifier/offset compensation 14 amplifies this mixture in the input stages so that the FBAS level is raised to an average of 0 volt during the synchronization pulse, controlled by the offset compensation signal. According to the level of the additional data signals, there is such a gain here that the AD converter input converter range is optimally utilized, including possible noise. Limiting the amplifier protects the AD converter from destruction in these times because chrominance and luminance are transmitted.

The additional data is transmitted using biphase signals, so that transmission at a low error rate with additional data signal levels of a few mV is possible in reception by averaging due to integration, even if clamping and offset compensation are not accurate.

The programmability of the additional data transmission system permits simple adaptation to SECAM, NTSC, PAL and PALplus.

The frame pulse BI, line pulse ZI and system clock pulse ST are available on the transmitting end and also on the receiving end for rate adaptation between source and transmission system or sink and transmission system and for frame and overframe synchronization.

What is claimed is:

1. A method of transmitting additional data in television images comprising the steps of:
    a) for each FBAS signal of a television frame to be transmitted, storing predetermined line structure data, the predetermined line structure data containing intervals free of color and/or video signals,
    b) deriving a frame pulse and line pulses from the FBAS signals of the television frame to be transmitted,
    c) counting the line pulses in response to the frame pulse,
    d) selecting the line structure data stored for a first FBAS signal of the frame to be transmitted as a function of the frame pulse and a first line pulse,
    e) inserting the additional data into the intervals free of color and/or video signals of the first FBAS signal in a rhythm of a predetermined data clock pulse and as a function of the line structure data of the first FBAS signal,
    f) transmitting the additional data in the first FBAS signal with signal levels that reduce interference in the reception of television broadcasts, and
    g) repeating steps d) through f) for each additional FBAS signal of the television frame to be transmitted.

2. The method as recited in claim 1 wherein the line structure data stored in step a) contain a split permission signal that defines a time position and a quantity of additional data to be transmitted in the intervals free of color and/or video signals of the FBAS signals, and wherein in step a) two split sequences of a predetermined length are stored, in step b) a system clock signal is derived from the FBAS signals, and step d) includes the following steps:
    splitting the additional data using the split sequences; and
    converting the split additional data to an analog, band-limited additional data signal together with the split permission signal under control of the data clock pulse.

3. The method as recited in claim 1 wherein the signal levels of the additional data are lower than 20 mV.

4. The method as recited in claim 1 wherein the additional data comprises video and audio signals that are inserted into the FBAS signal using a time-division multiplex method.

5. The method as recited in claim 1 further comprising the steps of storing, buffering and compressing the additional data before insertion into the FBAS signal.

6. The method as recited in claim 1 further comprising the following steps carried out by a receiver of the transmitted additional data:
    g) for each FBAS signal of the television frame storing the predetermined line structure data containing the color and/or video signal-free intervals in the FBAS signal,
    h) retrieving the frame pulse, the line pulses and the data clock pulse from the FBAS signals containing the additional information,
    i) counting the line pulses in response to the frame pulse,
    j) selecting the line structure data stored for a first received FBAS signal containing the additional data as a function of the frame pulse and the first line pulse,
    k) recovering the additional data from the first received FBAS signal by correlating the first received FBAS signal with the line structure data assigned to the first received FBAS signal, and
    l) repeating steps j) and k) for each additional received FBAS signal that contains additional data.

7. The method as recited in claim 6 wherein the line structure data stored in step g) contains a split permission signal, which defines the time position and the quantity of additional data to be received in the color and/or video signal-free intervals of the respective FBAS signal, and further comprising the steps of:
    storing one of two split sequences,
    before carrying out step k), clamping the FBAS signal containing additional data, limiting an amplitude of the FBAS signal and converting the FBAS signal to a digital signal, and
    multiplying the FBAS signal with the split permission signal and with the one split sequence and integrating over the period of time defined by the split permission signal.

8. The method as recited in claim 6 further comprising the step of demultiplexing the additional data.

9. A transmitting device for transmitting additional data in a television transmitter, the transmitting device comprising:
    a transmitter-synchronization device for generating frame pulses and line pulses from FBAS signals of a television frame to be transmitted;
    a line counter for counting the FBAS signals of the television frame, the line counter having a first input for receiving the frame pulses and a second input for receiving the line pulses;

a storage device connected to the line counter for storing line structure data for each FBAS signal of the television frame; and an adder having an input for the FBAS signal and another input for receiving the additional data to be inserted into the FBAS signal during color and/or video signal-free intervals of the FBAS signal in the rhythm of a data clock pulse, signal levels of the additional data being limited to reduce interference.

10. The transmitting device as recited in claim 9 wherein the transmitter synchronization device comprises:

a synchronous processor that derives a predetermined processor clock signal, a vertical signal and a horizontal signal from the FBAS signals;

a scaler device for generating a predetermined system clock signal from the processor clock signal, where each FBAS signal is assigned a predetermined number of system clock pulses;

a line pulse detector for generating the line pulses from the horizontal signal, where each line pulse corresponds to a first edge of the system clock signal in the FBAS signal; and a frame pulse detector for generating the frame pulses from the vertical signal, where each frame pulse corresponds to a first edge of the system clock signal of a new frame;

the transmitting device having a system clock pulse counter connected to the storage device for counting the system clock pulses.

11. The transmitting device as recited in claim 9 wherein the line structure data stored for each FBAS signal contains a split permission signal that defines a time position and a quantity of additional data to be transmitted in the respective color and/or video signal-free intervals, two split sequences of a predetermined length being stored in the storage device for splitting the additional data to be transmitted.

12. The transmitting device as recited in claim 9 further comprising a digital-analog converter for converting the additional data to be transmitted into an analog additional data signal with a predetermined signal level, and a filter for limiting a band of the analog additional data signal.

13. A receiving device for receiving additional data transmitted by a television transmitter and for use with a television receiver, the receiving device comprising:

a receiver synchronization device for generating frame pulses and line pulses from received FBAS signals containing the additional data;

a line counter for counting the received FBAS signals of each television frame, the line counter having a first input for receiving the frame pulses and a second input for receiving the line pulses;

a storage device connected to the line counter for storing line structure data used at the transmitter for each FBAS signal containing color and/or video signal-free intervals, and for storing several predetermined control signals; and a correlation receiver for retrieving the additional data from the FBAS signal currently received, the correlation receiver having an input for the currently received FBAS signal containing the additional data and another input for the control signals and the line structure data corresponding to the FBAS signal.

14. The receiving device as recited in claim 13 wherein the line structure data stored for each FBAS signal contains a respective split permission signal used at the transmitter to define a time position and a quantity of additional data to be received in the color and/or video signal-free intervals, a split sequence used at the transmitter end being stored in the storage device, and wherein the correlation receiver has a digital multiplier having a first input for receiving the received FBAS signal, a second input for receiving the respective split permission signal, a third input for receiving the split sequence, a digital integrator controlled by the control signals and a controlled decision-making device.

15. The receiving device as recited in claim 13 wherein the receiver synchronization device comprises:

a synchronous processor for deriving a predetermined processor clock signal, a vertical signal and a horizontal signal from the received FBAS signals;

a scaler device for generating a predetermined system clock signal from the processor clock signal, where a predetermined number of system clock pulses is assigned to each FBAS signal;

a line pulse detector for generating the line pulses from the horizontal signal, where each line pulse corresponds to a first edge of the system clock signal in the respective FBAS signal; and a frame pulse detector for generating the frame pulses from the vertical signal, where each frame pulse corresponds to a first edge of the system clock signal of a new frame;

the receiving device having a system clock counter connected to the storage device for counting the system clock pulses assigned to the received FBAS signal.

16. The receiving device as recited in claim 13 further comprising a clamping circuit, a device for offset compensation and for limiting the signal level and an analog-digital converter connected upstream from the correlation receiver.

17. A system for transmitting additional data in television comprising a transmitting device and a receiving device, the transmitting device including:

a transmitter-synchronization device for generating frame pulses and line pulses from FBAS signals of a television frame to be transmitted;

a line counter for counting the FBAS signals of the television frame to be transmitted, the line counter having a first input for receiving the frame pulses and a second input for receiving the line pulses;

a storage device connected to the line counter for storing line structure data for each FBAS signal of the television frame to be transmitted; and an adder having an input for the FBAS signal being transmitted and another input for receiving the additional data to be inserted into the FBAS signal during color and/or video signal-free intervals of the FBAS signal in the rhythm of a data clock pulse, signal levels of the additional data being limited to reduce interference; and the receiving device comprising:

a receiver synchronization device for generating frame pulses and line pulses from received FBAS signals containing the additional data;

a line counter for counting the received FBAS signals of each television frame, the line counter having a first input for receiving the frame pulses and a second input for receiving the line pulses;

a storage device connected to the line counter for storing line structure data used at the transmitter for each FBAS signal containing color and/or video signal-free intervals, and for storing several predetermined control signals; and a correlation receiver for retrieving the additional data from the FBAS signal currently received, the correlation receiver having an input for the currently received FBAS signal containing the additional data and another input for the control signals and the line structure data corresponding to the FBAS signal.

* * * * *